Jan. 3, 1950

M. RUSSELL ET AL 2,493,033

ATTACHMENT FOR METAL CUTTING MACHINES

Filed Feb. 8, 1946

INVENTORS
MARK RUSSELL
ARTHUR E. RAINVILLE

BY *m.a.Haye*

ATTORNEY

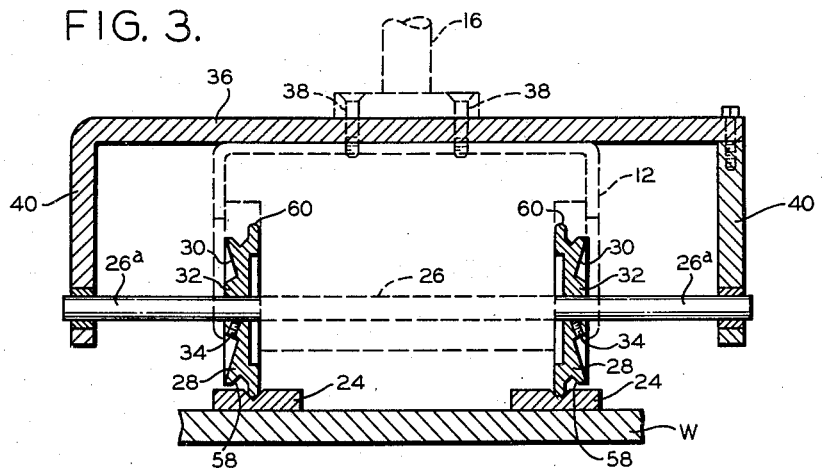
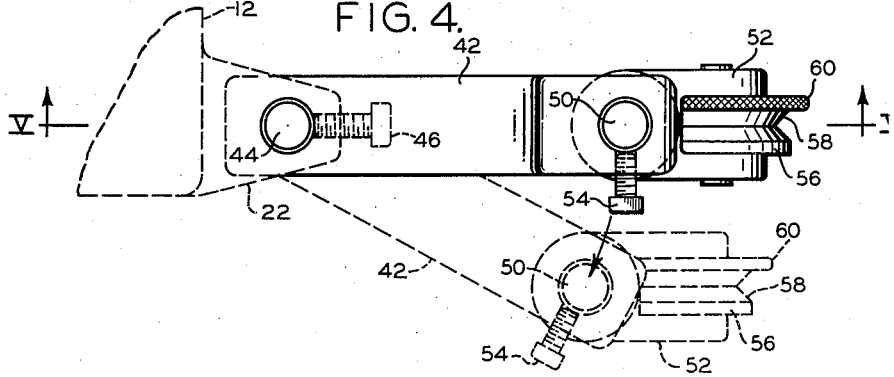
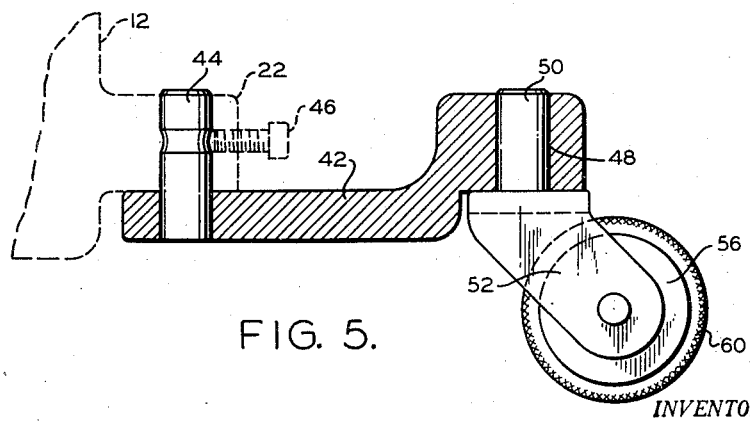

Patented Jan. 3, 1950

2,493,033

UNITED STATES PATENT OFFICE 2,493,033

ATTACHMENT FOR METAL CUTTING MACHINES

Mark Russell, Beverly, and Arthur E. Rainville, Arlington, Mass.

Application February 8, 1946, Serial No. 646,477

2 Claims. (Cl. 104—1)

(Granted under the act of March 3, 1883, as amended April 30, 1928; 370 O. G. 757)

This invention relates to metal cutting machines of the portable, motor-driven, oxyacetalene type and more particularly to an attachment therefor for facilitating and expediting cutting operations on channel irons or I-beams and the like.

Various attachments have been provided for the commercial type of gas torch, cutting machines, presently used in structural fabrication, to render such machines capable of cutting circles, curves, straight lines, irregular shapes, etc., and to enable certain of these operations to be performed upon channel and I-beams as well as upon flat stock. In straight line cutting operations upon flat stock it is customary to employ parallel, steel tracks in which the driven and trailer wheels of the machine are guided to make the cut. When it is desired to perform cutting operations upon channel irons or I-beams, these tracks are dispensed with, and additional roller attachments are applied to either or both sides of the machine housing. These roller attachments are arranged to guide the machine as its driven feed rollers ride along the flange surface of the beam with the guide rolls engaging the opposed surfaces of the web thereof. In the case of channel irons, the general practice is to have the driven rolls of the machine ride along the web of the channel with the guide rolls bearing against the internal surfaces of the flanges of the channel. When the machine is next again used for cutting operations on flat surfaces, the auxiliary guide roll attachments serve no useful purpose and may present such an obstruction to the work progress as would require their removal. If, following the operations upon the flat stock, it is desired to again use the machine for cutting operations on channel or beam members, it is necessary to reattach the guide rolls. Briefly, these auxiliary guide roll attachments become surplusage when the machine is used for cutting operations on flat stock, and yet are essential when the machine is used for cutting operations on channel or beam members. For the most part, these attachments are cumbersome, composed of a multiplicity of parts that require complicated adjustments and are generally expensive in manufacturing as well as maintenance and upkeep costs.

Accordingly, it is an object of the present invention to provide a torch cutting machine with an attachment, the construction and arrangement of which is such that once it is attached to the machine, the machine at all times is in readiness for work either upon flat stock or beam members and is equally adaptable for use on either, by the making of but a few simple adjustments and without the necessity of adding or removing parts.

It is a further object of the invention to provide a simple and inexpensive attachment of this character in which the peripheral formation of the driven and trailer rolls is such that when the machine is used on channels or beam members the wheels in cooperation with the edges of the flanges of the latter serve to guide as well as drive the machine and thus obviate the necessity of using either tracks or a special attachment for this type of work.

A further object of the invention is to provide an attachment of this character, the arrangement and construction of which is such that the driven and trailer rolls are adjustable with respect to each other and with respect to the machine housing, whereby they may be readily and easily adjusted for cutting operations on channels and beams of varying widths.

With the above and other objects and features in view, the invention will now be described with reference to the accompanying drawings which illustrate a preferred embodiment of the invention and will be pointed out in the claims.

In the drawings:

Fig. 3 is a sectional elevation taken transversely of the machine showing the bracket for supporting the driven roll shaft and illustrating how the formation of the periphery of the rolls permits the use of the machine for flat stock work, wherein tracks are used, as well as for the beam cutting work illustrated in Figs. 1 and 2;

Fig. 4 is a detailed top plan view of the pivotal bracket for mounting the improved trailer rolls; and Fig. 5 is a sectional elevation taken along the line V—V of Fig. 4.

Figure 1:
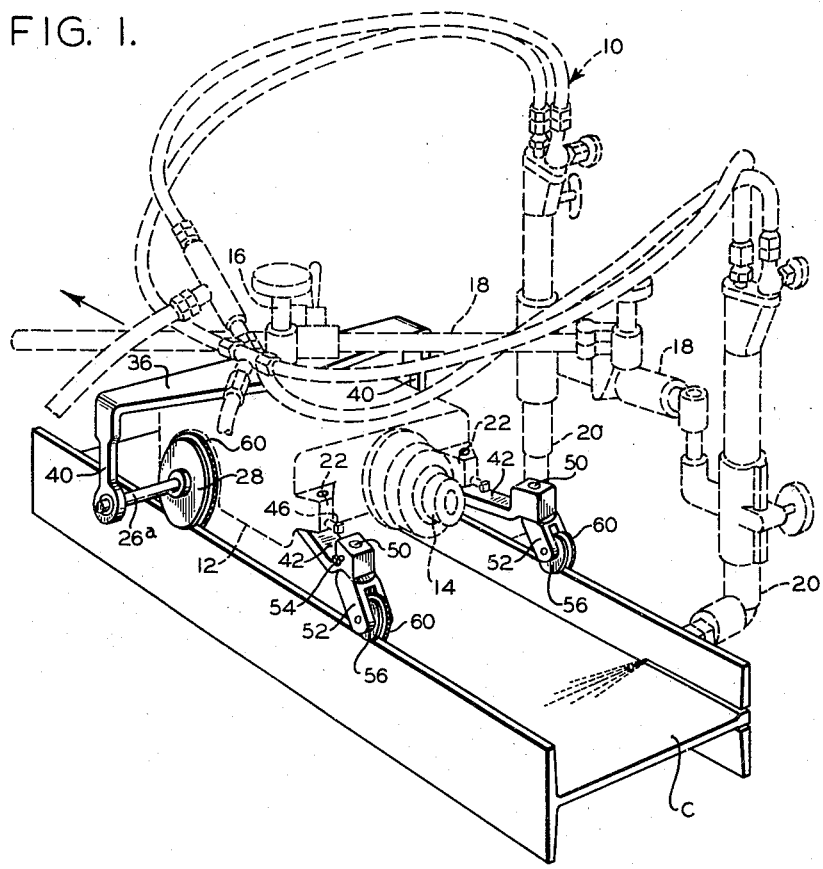
Fig. 1 is a perspective view of a conventional cutting machine with the improved attachment applied thereon, the machine being shown in phantom and the attachment in full lines and the disclosure illustrating the use of the machine in connection with a cutting operation upon an I-beam.
Figure 2:
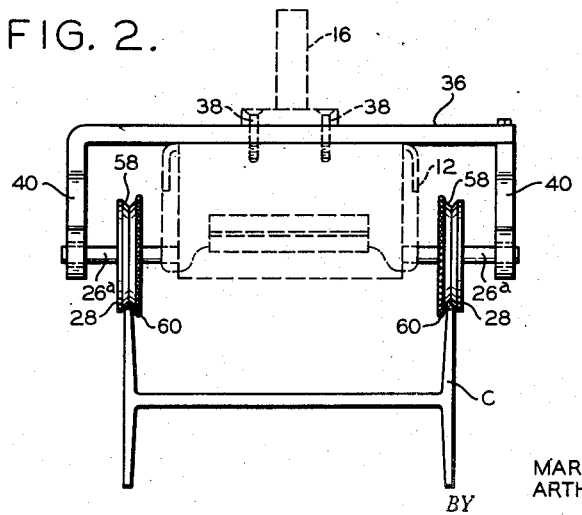
Fig. 2 is a partial end elevation thereof.

Referring to Fig. 1, the torch cutting machine is generally indicated at 10. The machine is shown in phantom and the attachments embodying the present invention are shown in full lines. The machine is of a well-known commercial type and includes a housing 12 in which is encased a drive motor and transmission assembly (not shown). An indexed speed control indicator 14 operates through suitable governor mechanism, also contained within the housing, to control the speed of the feed movement of the machine along a workpiece (flat stock, beam or channel iron). Centrally of the top of the housing is the usual, upwardly projecting, torch holder post 16 to which is secured in the usual manner the conventional brackets and arms 18 that support the cutting torches 20. Projecting from the rear end of the housing are a pair of conventional brackets 22, the purpose of which is to receive and support the trailer wheels. In the commercial type of machine these trailer wheels are mounted directly in the sockets.

In the standard machines presently used the motor (not shown) is suitably connected with and drives a horizontally disposed shaft upon which are mounted in fixed relation a pair of feed wheels. Since the shaft is of a length corresponding to the width of the machine housing, and since the wheels are not adjustable laterally along the shaft, the scope of the use of the machine on beam or channel members is necessarily restricted to beams or channels of widths which will accommodate the machine. When the machine is used on flat work the machine is usually guided by tracks 24 such as are shown in Fig. 3. Heretofore, when it was desired to use the machine for the cutting of an I-beam or a channel member such as illustrated in Fig. 1, it has been necessary to attach to the sides of the housing 12 a special attachment having guide rolls thereon. In making cuts upon beam or channel members it has been the custom to have the driven and trailer rolls ride upon the upper surface or flat of the flange of the beam and to have the auxiliary guide rolls, through offset brackets, arranged in engagement with the opposed surfaces of the web of the beam. This method of providing for the cutting of channels and beams as well as upon flat work, has caused considerable inconvenience and, as before stated, often requires repeated mounting and removal of the auxiliary guide roll device.

The present invention provides an attachment which when once assembled upon the machine readily renders the machine adaptable for use on either flat or channel and beam work, without the necessity of adding or removing parts, and by the making of but a few simple adjustments.

The attachment of the present invention includes a driven shaft 26 longer in length than the conventional shaft used on these machines and mounted transversely of the housing in place of the conventional shaft with its opposite ends 26a extending for equal distances beyond the outer confines of the housing (Fig. 3). Mounted upon shaft 26 are a pair of oppositely disposed wheels 28. The outer faces of these wheels are beveled as at 30, inwardly, toward their hubs 32. In each of the hubs 32 there is threaded a set screw 34 by means of which the wheels may be adjusted along the shaft with respect to each other and with respect to the housing 12. A horizontally disposed arm 36 is secured to the top of the housing 12 beneath the post 16 as by screws 38. The arm 36 carries depending projections 40 in the lower ends of which are rotatably journaled the opposite ends of shaft 26. Thus it is seen that the arm 36 and projections 40 form a bracket which gives rigidity and support to the shaft 26. The remainder of the attachment comprises a pair of similar arms or brackets 42 each having upstanding pins 44 arranged to be pivotally mounted within the sockets 22. A stud or screw 46 threaded in the sockets 22 provides means for locking the brackets in any angular position to which they may be adjusted as suggested by the dotted line indication in Fig. 4. The brackets 42 at their outer ends are each provided with a bore 48 of just sufficient diameter to receive the upstanding shank 50 of a trailer caster 52. Studs 54 threaded in the outer ends of the brackets 42 engage the shanks 50 to hold the casters 52 in any position to which they have been adjusted. Each caster 52 supports a freely rotatable trailer wheel 56.

The rims or peripheries of each of the driven wheels 28 and trailer wheels 56 are formed with a recess or V-groove 58 and adjoining one side of each of these V-grooves is a projecting continuous flange 60, the purposes of which flanges and V-grooves will now appear.

By the provision of the structure just described, the machine is rendered readily adaptable for use on flat work as illustrated in Fig. 3 or for use on channel or I-beam members as illustrated in Fig. 1. In using the machine on flat work (see Fig. 3) the conventional tracks 24 are suitably secured along the upper face of the workpiece W in spaced relation as shown. The wheels 28 are then adjusted by set screws 34 so that their projecting flanges 60 ride in the tracks. The trailer wheels 56 are similarly adjusted by moving the brackets 42 into proper angular position and rotating the shank 50 within the bores 48 into correct position so that the flanges 60 of the trailer wheels 58 ride in the tracks 24. Following these latter adjustments the screws 54 and 46 are taken up. By these few, simple adjustments the machine is in readiness to perform the cutting operation upon flat stock assuming, of course, that the arms 18 have been adjusted in the usual fashion to properly present the torch or torches 20 to the workpiece. The provision of the projecting flanges 60 on the wheels 28 and 56 provides for the use of the machine in the conventional manner upon flat stock with track guidance. When it is desired to use the machine on channel or I-beam members (see Fig. 1) it is merely necessary to adjust the wheels 28 and 56 to a width where the centers of their V-grooves correspond with the width between the medial centers of the edges of the flanges of the channel or I-beam. By the provision of the recesses or V-grooves 58, the peripheries of the wheels straddle these flanged edges and the latter serve as tracks to guide the machine as the driven wheels 28 feed the machine and cutting torches 20 along the workpiece C. It is noted that the projecting flanges 60 in nowise interfere with the operation of the machine for this class of work.

The invention described herein may be manufactured and used by or for the Government of the United States of America for government purposes without the payment of any royalty thereon or therefor.

Having described the invention what is claimed as novel and desired to be protected by Letters Patent of the United States is:

1. An attachment mountable on the housing of a metal cutting machine to perform cutting operations on beam members having flanged edges, said attachment comprising a driven shaft mountable in the housing with the opposite ends of the shaft extending therefrom, a horizontally disposed arm secured to said housing and having depending projections wherein are journally mounted said shaft extensions, two driving wheels having V-shaped grooves in their peripheries for tracking engagement with the flange edges of said beam members, said driving wheels being adjustable along said shaft relative to said housing and relative to each other to accommodate beam members of varying size and fixable by set screws to the shaft to drive the housing along the beam, two trailing caster wheels having peripheral V-grooves for trailing engagement with said flange edges, two substantially horizontal supporting bracket members, the upper ends of the shafts of said caster wheels each being pivotally journalled in one end of said bracket members, means for adjustably securing said shafts of said casters in said journals, the other end of said bracket members having upstanding pins attached thereto, said pins being rotatably journalled in said housing, and means for adjustably securing said pins in said housing, whereby the trailer wheels are adjustable to conform to the adjusted position of the driven wheels.

2. An attachment mountable on the housing of a metal cutting machine for making said machine readily adaptable for a variety of cutting operations, said attachment comprising, a driven shaft having opposite ends thereof extending from said housing, a horizontally disposed arm secured to said housing and having depending projections wherein are journalled said shaft extensions, two driving wheels capable of traveling on a track or on the surface of the work, said driving wheels being adjustable along said shaft relative to said housing and to each other and fixable to said shaft to drive the machine along the work, two trailing caster wheels capable of traveling on a track or on the surface of the work, two substantially horizontal bracket members having upstanding pins attached thereto at one end thereof, said pins being journalled in said housing, means for adjustably securing said pins in said housing, said brackets each having an opening at the other end thereof for receiving the upper ends of the shafts of said caster wheels, and means for adjustably securing the shafts of said caster wheels in said brackets whereby said caster wheels are individually adjustable about two vertical axes to conform to the adjusted position of said driven wheels.

MARK RUSSELL.
ARTHUR E. RAINVILLE.

REFERENCES CITED

The following references are of record in the file of this patent:

UNITED STATES PATENTS

| Number | Name | Date |
|---|---|---|
| 381,312 | Wilson | Apr. 17, 1888 |
| 801,711 | Collins | Oct. 10, 1905 |
| 1,320,687 | Harris | Nov. 4, 1919 |
| 1,389,046 | Harris | Aug. 30, 1921 |
| 1,569,154 | Temple | Jan. 12, 1926 |
| 1,748,309 | Rose | Feb. 25, 1930 |
| 1,811,835 | Anderson | June 30, 1931 |
| 2,015,329 | Anderson | Sept. 24, 1935 |
| 2,187,731 | Davis | Jan. 23, 1940 |
| 2,190,091 | Wolfe | Feb. 13, 1940 |
| 2,270,242 | Anderson | Jan. 20, 1942 |
| 2,280,029 | Crowe | Apr. 14, 1942 |
| 2,293,879 | Anderson et al. | Aug. 25, 1942 |